United States Patent [19]
Sallez et al.

[11] Patent Number: 5,437,350
[45] Date of Patent: Aug. 1, 1995

[54] STEERING COLUMN ASSEMBLY, IN PARTICULAR FOR MOTOR VEHICLES

[75] Inventors: Jean-Philippe Sallez; André Hoblingre, both of Valentigney; Christian Henigue, Audincourt, all of France

[73] Assignee: ECIA - Equipment et Composants pour l'Industrie Automobile, Audincourt, France

[21] Appl. No.: 71,007

[22] Filed: Jun. 2, 1993

[30] Foreign Application Priority Data

Jun. 3, 1992 [FR] France ................... 92 06735

[51] Int. Cl.⁶ ............................................. B60R 25/02
[52] U.S. Cl. ..................... 180/287; 70/222; 70/223; 74/552; 280/771
[58] Field of Search ............... 280/771; 180/271, 287; 74/552; 70/218, 222, 223, 252; 192/67 R

[56] References Cited

U.S. PATENT DOCUMENTS

| | | | |
|---|---|---|---|
| 1,437,480 | 12/1922 | Vanderlip | 70/223 |
| 3,566,634 | 11/1968 | Borck . | |
| 4,060,007 | 11/1977 | Levesque | 192/67 R |
| 4,674,354 | 6/1987 | Brand | 74/552 |
| 4,811,580 | 3/1989 | Jang | 180/287 |

FOREIGN PATENT DOCUMENTS

| | | |
|---|---|---|
| 58590 | 8/1982 | European Pat. Off. . |
| 336881 | 10/1989 | European Pat. Off. . |
| 2527150 | 11/1983 | France . |
| 1200026 | 12/1985 | U.S.S.R. ............. 192/67 R |

*Primary Examiner*—Eric D. Culbreth
*Attorney, Agent, or Firm*—Sughrue, Mion, Zinn, Macpeak & Seas

[57] ABSTRACT

This assembly includes a steering shaft (101) which can move in rotation in a column body (102) and includes an anti-theft bolt (104) mechanism (103) which can move between a retracted position and an active anti-theft position. The shaft includes two shaft portions (105, 106), one (105) carrying a steering wheel and the other (106) being connected to the rest of a vehicle steering mechanism. The portions are connected by a disengagable linkage mechanism (108) which can move, under the control of the anti-theft mechanism, between an active position for coupling the two shaft portions and a retracted anti-theft position freeing the two shaft portions from each other so that the shaft portion (105) carrying the steering wheel can rotate freely with respect to the other shaft portion (106). The corresponding end zones (105a, 106a) of the shaft portions are arranged one around the other, and the disengagable linkage mechanism (108) is mounted so as to move around the shaft portion carrying the steering wheel.

35 Claims, 10 Drawing Sheets

STEERING COLUMN ASSEMBLY, IN PARTICULAR FOR MOTOR VEHICLES

The present invention relates to a steering column assembly in particular for a motor vehicle.

More particularly, the invention relates to a column assembly of the type including a steering shaft mounted so as to move in rotation in a column body including an anti-theft bolt mechanism for the vehicle, which can move between a retracted position and an active anti-theft position.

In certain assemblies of this type, the steering shaft includes two shaft portions, one carrying the steering wheel and the other being connected to the rest of the vehicle steering mechanism, and which are connected by disengagable linkage means which can be moved, under the control of the anti-theft mechanism, between an active position for coupling the two shaft portions and a retracted anti-theft position freeing the two shaft portions from each other, so that the shaft portion carrying the steering wheel can rotate freely with respect to the other shaft portion connected to the rest of the vehicle steering mechanism.

Such column assemblies are known for example from document EP-A- 0,058,590.

This document describes an anti-theft device with disengagement of the steering wheel for a motor vehicle, in which the steering rod is formed by two segments, namely a primary rod, on which the steering wheel is mounted, and a secondary rod, connected to the rest of the vehicle steering mechanism.

These two rods are arranged end-to-end, and the secondary rod is driven by the primary rod through a disengagable linkage involving an appropriate construction of the adjacent ends of the two rods, and an assembly cylinder having an internal surface constructed such that this cylinder is linked in rotation with one and/or the other of these ends, whilst being able to slide freely over them, the axial displacements of the assembly cylinder being obtained from the rotational movement of a key by means of a system comprising an eccentric and a connecting rod.

In fact, these devices were developed in order to improve the security of vehicles by making the steering wheel free to rotate in the active position of the anti-theft mechanism.

It was actually observed that conventional column assemblies in which the bolt of the anti-theft mechanism interlocks, in the active position, in a slot in the steering shaft, were easy to force, which led to a relatively high degree of damage to the steering column during attempted theft, and to a notable reduction in the operational safety of the vehicle.

However, assemblies of this type, described in the aforementioned document, have a certain number of drawbacks as regards their relatively complex structure, continuity of mechanical holding of the various components, and in particular of the shaft portions involved in the construction of these assemblies, the operational safety of the disengagable linkage means and the play in the transmission of the rotational movement between the shaft portion carrying the steering wheel and the shaft portion connected to the rest of the vehicle steering mechanism.

The object of the invention is therefore to solve these problems by providing a steering column assembly, in particular for a motor vehicle, of the type previously described, characterised in that corresponding end zones of the shaft portions are arranged one around the other, and in that the disengagable linkage means are mounted so as to move around the shaft portion carrying the steering wheel.

Advantageously, the linkage means comprise a sleeve tube which can move around at least one of the two shaft portions and includes first coupling means adapted to interact with complementary coupling means of the shaft portion connected to the rest of the vehicle steering mechanism, and secondary coupling means adapted to interact with complementary coupling means of the shaft portion carrying the steering wheel.

Also advantageously, at least the first coupling means are disengagable, and this assembly includes means for constraining the sleeve tube between the two shaft portions in its active position, in order to ensure transmission without play of the rotational movements between the shaft portions.

The invention will be better understood with the aid of the following description, which is given solely by way of example, and is made with reference to the attached drawings, in which.

Figure 1:
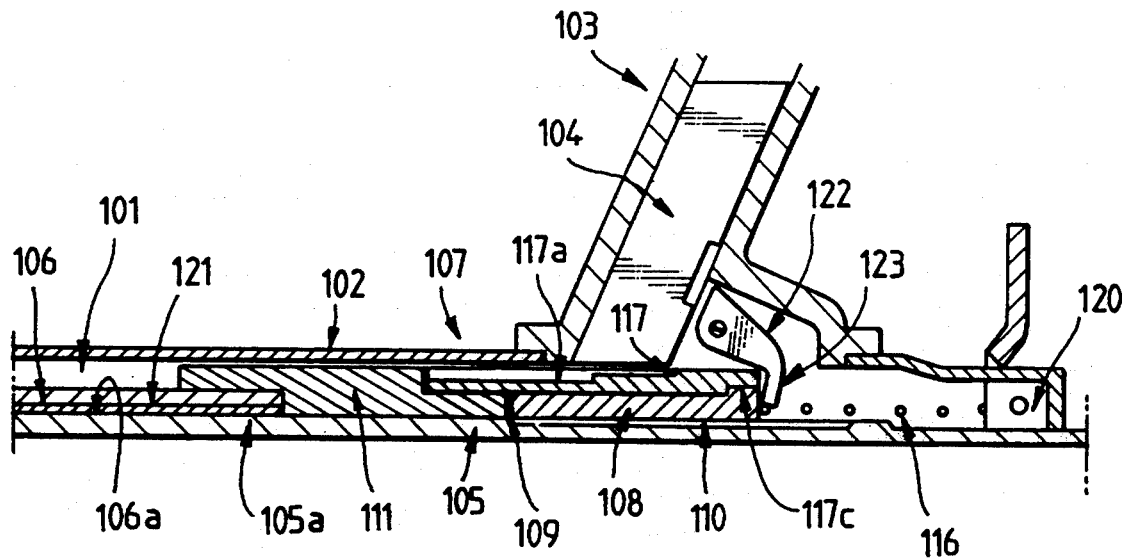
FIG. 1 represents a sectional view of a first embodiment of a steering column assembly according to the invention, in which engagable connection means involved in the construction of this assembly, are in the active position.

As can be seen in FIGS. 1 to 9, a steering column assembly, in particular for motor vehicles, includes a steering shaft 101 mounted so as to move in rotation in a column body 102 including an anti-theft bolt mechanism 103 for the vehicle. This bolt is designated by the general reference 104.

As will be described in more detail subsequently, this bolt is mounted so as to move between a retracted position represented in FIG. 1 and an active anti-theft position represented in FIG. 2.

The steering shaft includes two shaft portions designated by the general references 105 and 106 in these figures. One of these shaft portions carries the steering wheel whereas the other is connected to the rest of the vehicle steering mechanism.

These shaft portions are connected by disengagable linkage means designated by the general reference 107 in these figures. These disengagable linkage means are mounted so as to move, under the control of the anti-theft mechanism, between an active position for coupling the two shaft portions, represented in FIG. 1, and a retracted anti-theft position freeing the two shaft portions from each other, represented in FIG. 2, so that the shaft portion carrying the steering wheel can rotate freely with respect to the other shaft portion connected to the rest of the vehicle steering mechanism.

According to the invention, corresponding end zones of the shaft portions 105 and 106, designated respectively by the references 105a and 106a, are located one around the other, and the disengagable linkage means 107 are mounted so as to move around at least one of the two external and internal shaft portions.

In the embodiment represented in these figures, the internal shaft portion consists of the shaft portion designated by the reference 105 and carries the steering wheel, whereas the external shaft portion consists of the shaft portion designated by the reference 106, and is connected to the rest of the steering mechanism.

In these figures, the disengagable linkage means are mounted so as to move around the internal shaft portion 105.

The linkage means designated by the general reference 107 in fact comprise a sleeve tube 108 including first coupling means adapted to interact with complementary coupling means of the shaft portion 106 connected to the rest of this vehicle steering mechanism.

These first coupling means are designated by the general reference 109.

This sleeve tube also includes second coupling means adapted to interact with complementary coupling means of the shaft portion 105 carrying the steering wheel.

These coupling means are designated by the general reference 110 in these figures.

Advantageously, at least the first coupling means 109 are disengagable.

Figure 2:
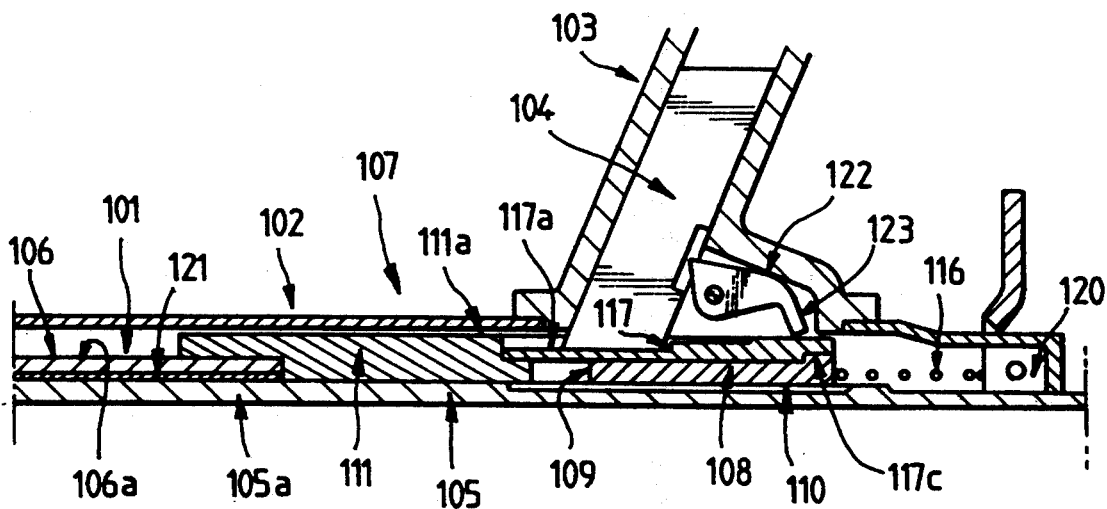
FIG. 2 represents a sectional view of the first embodiment of the assembly according to the invention, represented in FIG. 1, in which the disengagable linkage means are in the retracted anti-theft position.
Figure 3:
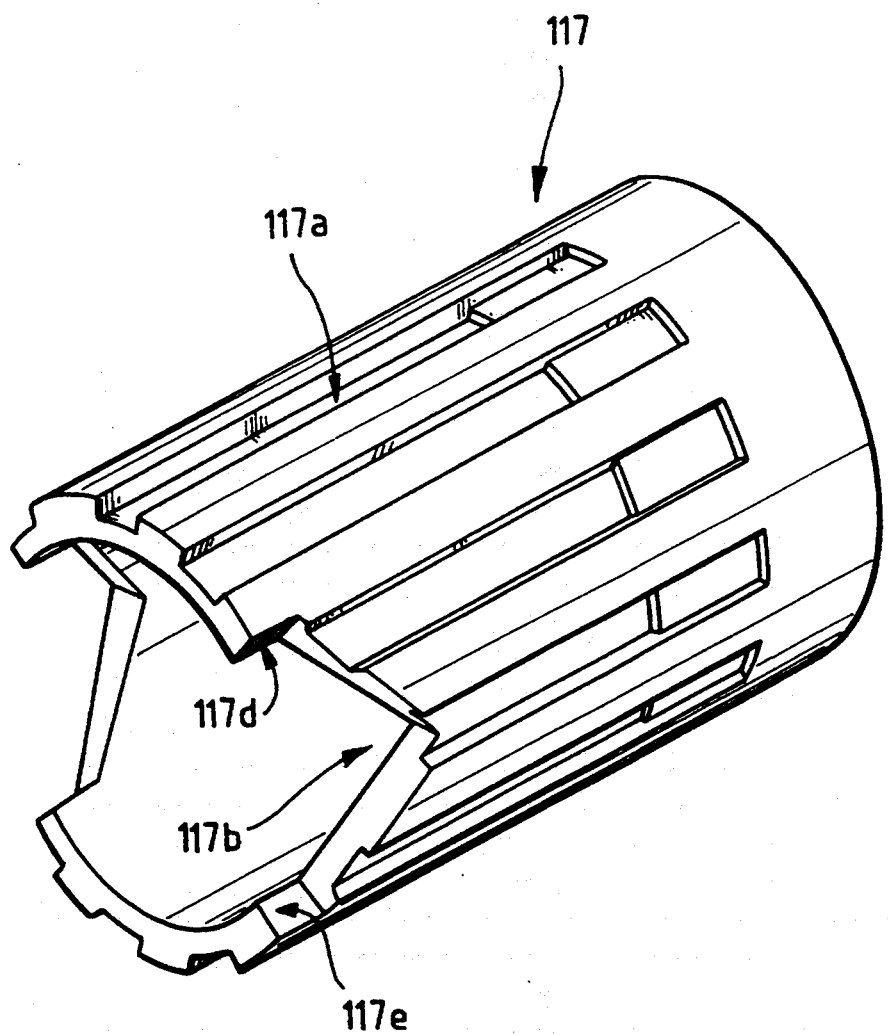
FIG. 3 represents a perspective view of a displacement ring of a sleeve tube involved in the construction of an assembly according to the invention.

As can be seen in the light of these figures, the sleeve tube 108 is mounted so as to move by sliding around the shaft portion carrying the steering wheel 105 between first position represented in FIG. 1 and a second position represented in FIG. 2, respectively positions for engagement and disengagement, of the first coupling means 109.

In fact, the second coupling means 110 may be formed by complementary radial projecting and hollowed parts of this sleeve tube 108, and of the corresponding shaft portion 105 in order to allow axial sliding of the sleeve tube with respect to this shaft portion. The complementary projecting and hollowed radial parts consist, for example, of splines of a type known per se.

The first coupling means 109 may themselves include corresponding axial projecting 109a and hollowed 109b coupling parts in the sleeve tube 108 and in the other shaft portion 106.

The corresponding projecting and hollowed parts of the shaft portion 106 may actually be made in a drive ring 111 integral with this shaft portion.

Advantageously, the first coupling means comprise at least two projecting parts adapted to interlock with at least two corresponding hollowed parts.

Advantageously, means are provided for constraining the sleeve tube 108 between the two shaft portions 105 and 106, in the active position of this sleeve tube, in order to ensure transmission without play of the rotational movement between the shaft portions.

In fact, this sleeve tube can be deformed radially, and in the embodiment represented in these figures, the first coupling means 109 also comprise means for clamping the sleeve tube 108 onto the shaft portion carrying the steering wheel 105, in its active position.

These clamping means comprise, in one embodiment, at least two axial projecting parts 112, 113 extending on either side of an axial slit 114 in the sleeve tube 108, and are adapted to interlock in at least one corresponding axial hollowed part 115 of the drive ring 111, integral with the shaft portion 106 connected to the rest of the vehicle steering mechanism.

Advantageously, these projecting or hollowed parts include sloped surfaces, for example 112a and 113a (FIG. 4) allowing correct clamping of the sleeve tube onto the shaft portion carrying the steering wheel.

Also advantageously, these clamping means comprise two sets of axial projecting parts, each separated by an axial slit in the sleeve tube, and angularly offset and adapted to interact with two corresponding hollowed parts in the ring 111.

Furthermore, some of the contact surfaces of these projecting and hollowed parts of the first coupling means may be bulged and the others in the shape of inclined planes, for example, which makes it possible to ensure automatic take-up of angular and radial play, in a conventional manner at these coupling means, by interaction of these types of surfaces.

It should also be noted that the first coupling means may comprise only a single set of projecting and hollowed parts fulfilling the functions both of coupling and of clamping.

Figure 4:
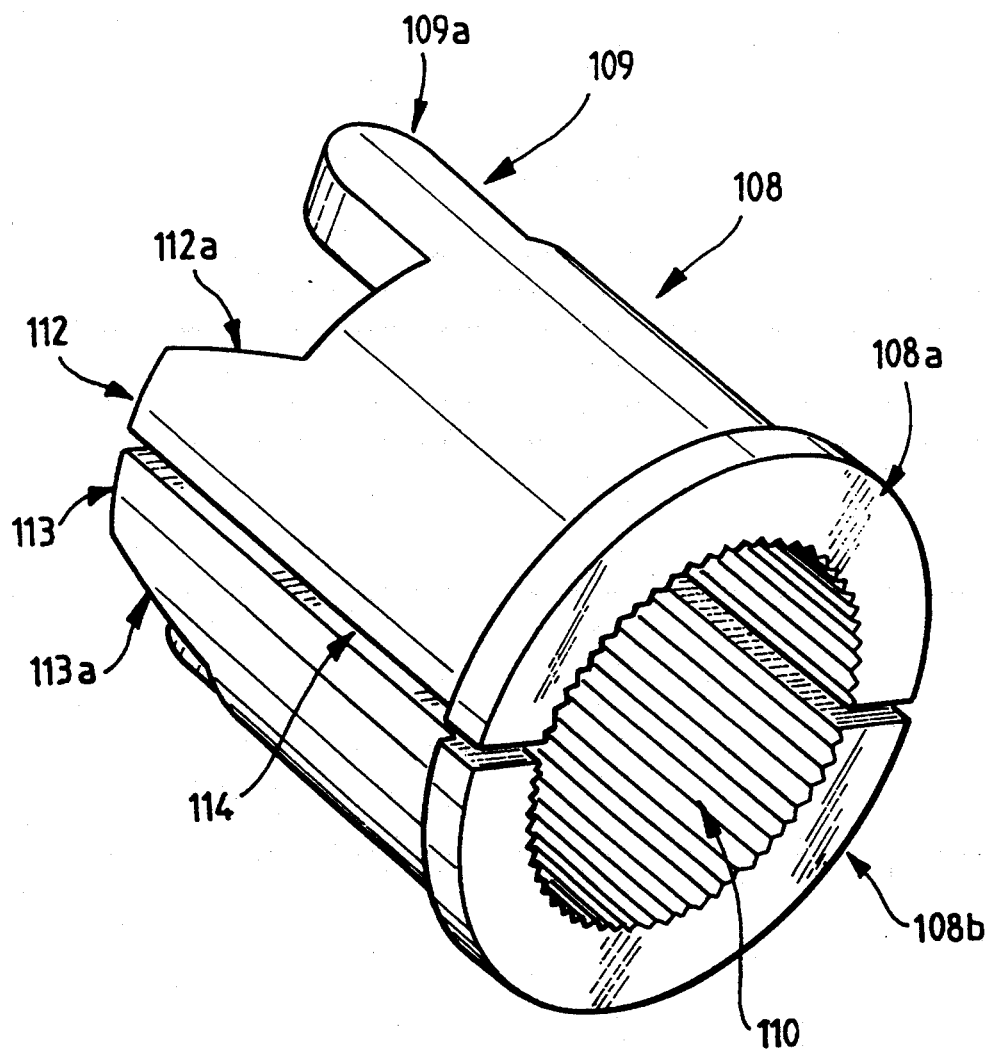
FIG. 4 represents a perspective view of a sleeve tube involved in the construction of an assembly according to the invention.
Figure 5:
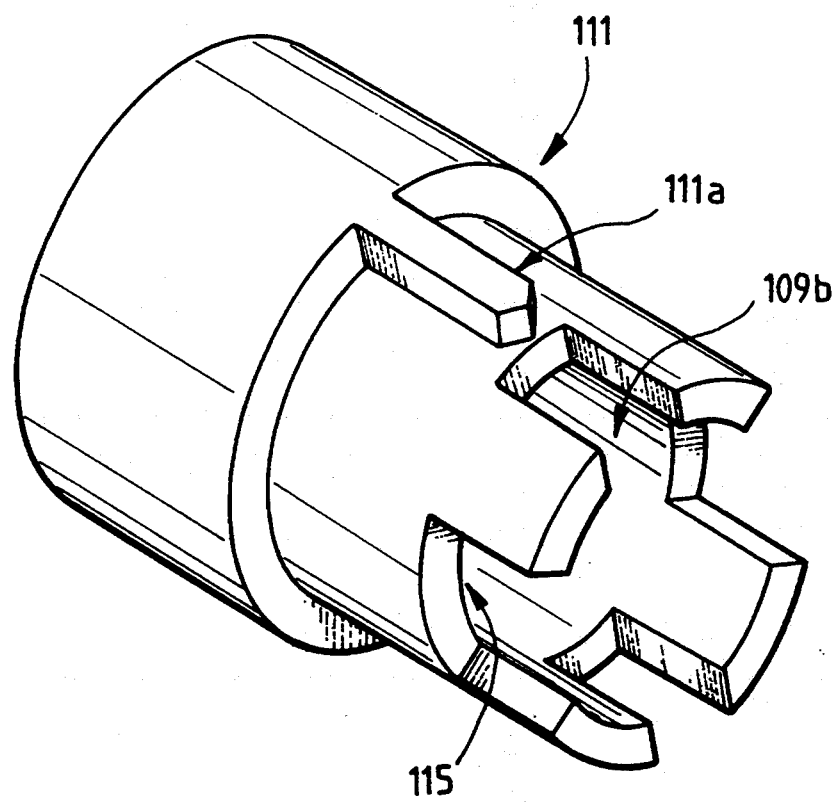
FIG. 5 represents a perspective view of a drive ring involved in the construction of an assembly according to the invention.

The sleeve tube may actually be formed of two half-shells 108a and 108b (FIG. 4).

Means 116 for stressing the sleeve tube into the active position for coupling the two external and internal shaft portions are also provided. These means are for example formed by a helical spring located around the shaft portion carrying the steering wheel 105. One of the ends of this spring bears on one end of the sleeve tube, and advantageously, the end of the sleeve tube opposite that at which the first coupling means 109 are provided, whereas the other end of this spring bears on a thrust bearing surface of the shaft portion 105.

This sleeve tube 108 also includes a displacement ring 117, which is free to rotate around this sleeve tube, but is linked in translation with it.

This displacement ring 117 includes:
- at its outer surface, at least one axial groove 117a adapted to receive the bolt in its active position, in order to block the displacement ring in rotation with respect to the column body,
- at one of its ends, at least one axial hollowed part 117b in the shape of a displacement cam adapted to interact with a complementary thrust bearing surface 111a in the drive ring 111 of the shaft portion connected to the rest of the steering mechanism; and
- at the other of its ends, at least one surface 117c for displacing the sleeve from its active position towards its retracted position for disengaging the first coupling means, when the shaft portions rotate, by bearing of the complementary thrust bearing surface 111a on the hollowed part in the shape of a cam in the displacement ring 117, as will be described in more detail subsequently.

Obviously, several parallel grooves may be arranged regularly over the outer surface of this displacement ring, in order to allow very fast blocking of the latter by the bolt 104.

It will be noted that the bottom of the, or each, groove is stepped, and includes a shoulder which makes it possible to delimit a non-return position of the sleeve tube in the active position, so long as the bolt is in the active position. This position will be described in more detail subsequently.

The, or each, axial hollowed part in the shape of a displacement cam 117b in this ring has a general V-shape, in which the ends of the arms are extended by axial and parallel planar portions forming stop surfaces 117d and 117e (FIG. 3) of the complementary thrust bearing 111a of the ring for driving the shaft portion connected to the rest of the steering mechanism, in order to limit the angular displacement thereof.

It will be noted in this respect that a functional clearance is provided between this complementary thrust bearing surface and these planar stop surfaces in order to avoid this set of components being stressed when the shaft portion connected to the rest of the vehicle steering mechanism returns elastically into position under the action of the vehicle tires.

The advantage of this functional clearance will be described in more detail subsequently.

Guide bearings for the shaft portion carrying the steering wheel, that is to say, in the embodiment represented in these figures, the shaft portion 105, are interposed on the one hand between the column body 102 and a corresponding part of this shaft portion, and on the other hand between another part of this shaft portion and a corresponding part of the shaft portion connected to the rest of the steering mechanism, that is to say the external shaft portion 106, in order to optimize the rigidity of the steering shaft and its natural frequency.

These guide bearings are designated respectively by the references 120 and 121.

One and/or the other of these bearings ensures axial immobilisation of the steering shaft 101 with respect to the column body 102. Furthermore, this assembly also includes retractable means for locking the sleeve tube in the active position.

These means are designated by the general reference 122 in these figures, and are mounted so as to move between an active locking position and a retracted position for unlocking this sleeve tube through the action of the anti-theft bolt mechanism of the vehicle, allowing addition coupling safety to be ensured.

In the embodiment represented in these FIGS. 1 to 9, the locking means 122 comprise a locking member in which one end 123 is curved into the shape of a hook, and adapted to interact with a corresponding thrust bearing surface of the displacement ring 117 or of the sleeve tube 108, in order to hold the latter in position and prevent it moving back, and in which the other end is connected to the anti-theft bolt mechanism, in order to move it.

In the embodiment represented, the corresponding thrust bearing surface of the sleeve tube is formed by the end surface of the sleeve tube, or of its displacement ring 117, opposite the one at which the first coupling means 109 are provided.

Figure 6:
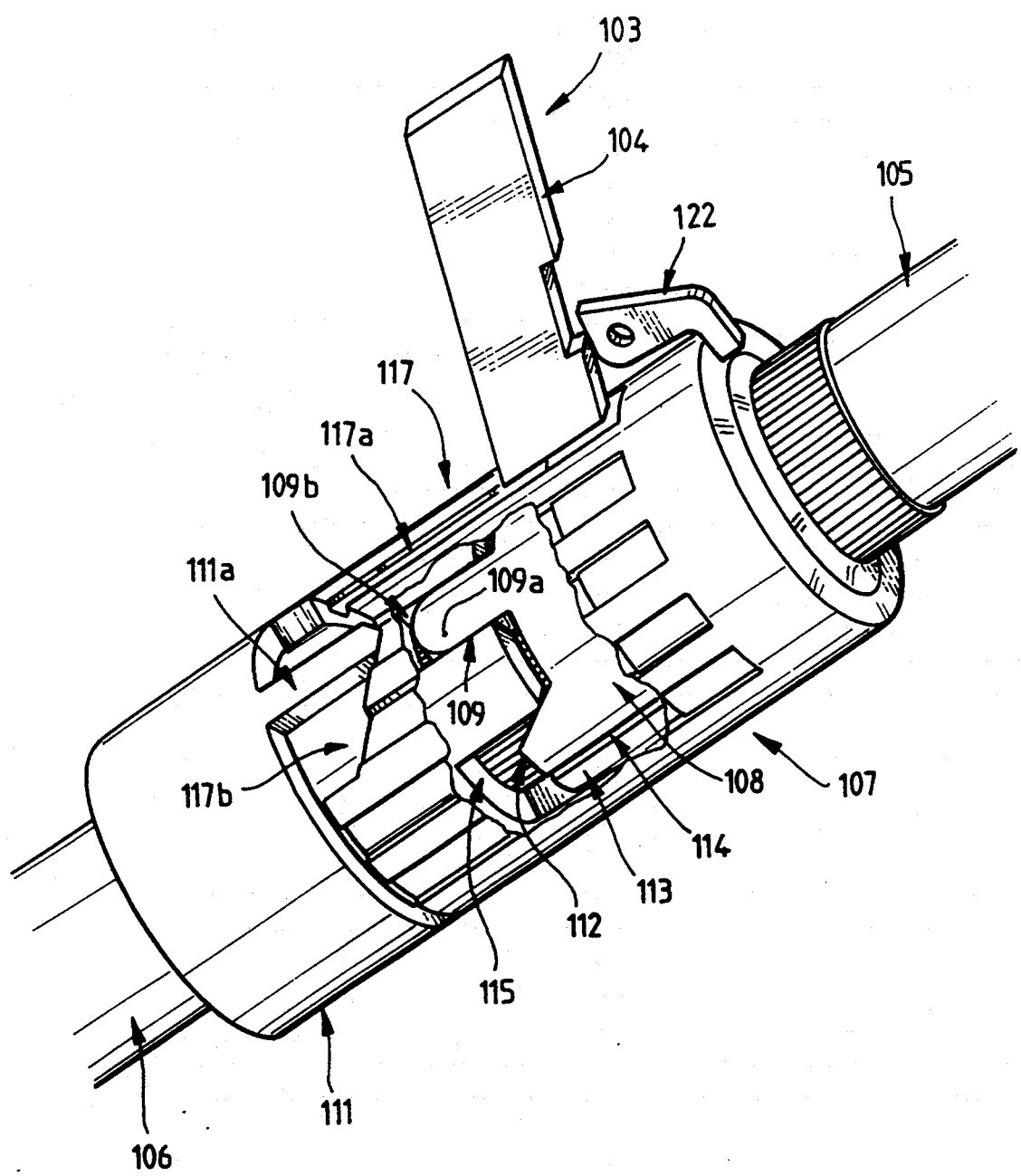
FIGS. 6, 7, 8 and 9 illustrate the displacement of the sleeve tube of the disengagable linkage means involved in the construction of an assembly according to the invention, between a position for coupling the two shaft portions, and a retracted anti-theft position freeing these portions from each other.

Referring to FIGS. 1, 2, 6, 7, 8 and 9, for example, it is clear that the elastic means 116 stress the sleeve tube 108 into the position for coupling the two shaft portions 105 and 106. In this position, the projecting parts 109a of the first coupling means 109 are interlocked in the corresponding hollowed parts 109b of the drive ring 111, and the means for constraining the sleeve tube clamp it on the shaft portion carrying the steering wheel (FIG. 6).

When a user turns the steering wheel, the rotational movement of the internal shaft portion 105 carrying the steering wheel is transmitted through the second coupling means 110 to the sleeve tube 108, and from this sleeve tube through the first coupling means 109 and the drive ring 111 to the external shaft portion 106 connected to the rest of the steering mechanism.

Any play in transmission between the shaft portions is eliminated because of the constraining of the sleeve tube between the two shaft portions.

Moreover, this internal shaft portion 105 carrying the steering wheel is guided on the one hand in the column body by means of the bearing 120, and on the other hand in the external shaft portion 108 by the bearing 121, so that it is guided correctly.

Thus, the assembly formed by the internal shaft portion 105, the disengagable linkage sleeve tube 108 and the external shaft portion 106 rotates with full freedom in the column body 102, in order to allow the user to control the steering of the vehicle.

Figure 7:
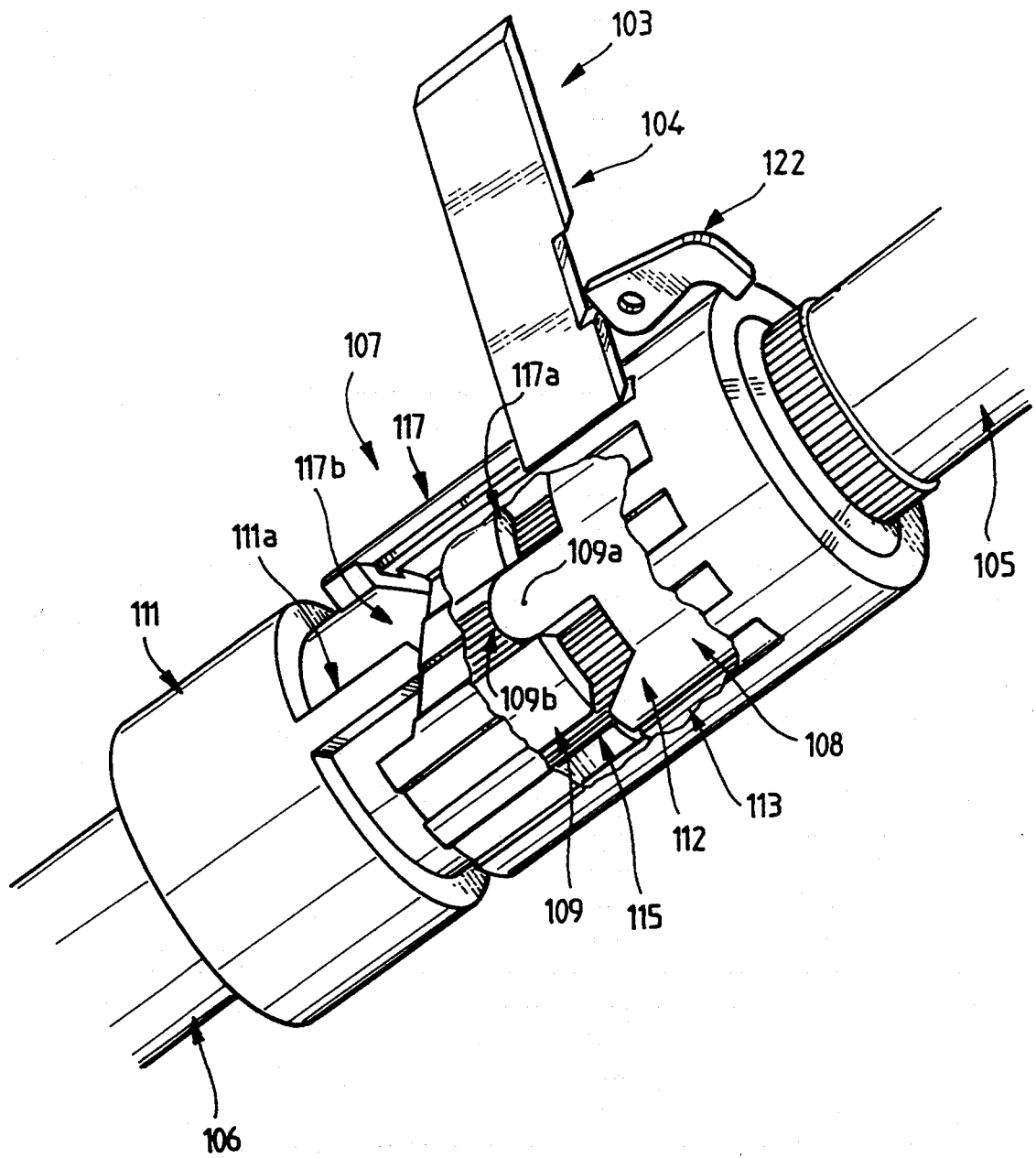

When the user actuates the anti-theft bolt mechanism of the vehicle, for example by withdrawing the key therefrom, the bolt 104 is freed, and moves in a manner which is known per se towards the steering shaft (FIG. 7).

This movement of the bolt towards the its active position is limited either by a portion of the displacement ring situated between two grooves, or by the stepped bottom of a groove, as a function of the position of this ring when the user actuates the anti-theft mechanism.

It will be noted that it is normal for a motor vehicle user to turn the steering wheel to some degree in order to obtain the desired locking effect from the bolt, in column assemblies including conventional anti-theft mechanisms, in which the bolt interlocks in a slot in the steering shaft. In fact, the slot in the shaft does not always face the bolt when the anti-theft mechanism is actuated, and it is necessary to move to shaft slightly, by means of the steering wheel, in order to align this slot with the bolt, so that the latter can interlock in the active position in this slot in order to produce the locking effect.

This procedure is profitably employed in the steering column assembly according to the invention in order to cause the sleeve tube of the disengagable linkage means to move towards its retracted anti-theft position for freeing the two shaft portions.

In fact, if the bolt 104 of the anti-theft mechanism is bearing against a portion of the displacement ring between two of its grooves, an angular movement of the steering wheel, and therefore of the shaft portions, by the user causes this ring to move with respect to the bolt, for example by being driven by the complementary thrust bearing surface 111a and the complementary cam-shaped hollowed part of this ring, until this bolt is released and can bear against the bottom of the groove, in order to block this ring in position with respect to the column body.

This lowering of the bolt towards its active position causes the locking means 122 to move towards a retracted position of unlocking the sleeve tube, as can be seen in FIG. 7.

If the user causes further angular movement of the steering wheel, and therefore of the shaft portions, the thrust bearing surface 111a of the drive ring comes to bear on one or other of the cam-shaped surfaces of the displacement ring of the sleeve tube. Continuing this angular movement of the shaft portions then causes this displacement ring, and therefore the sleeve tube 108, to move back against the stressing of the elastic means 116. This backwards motion of the sleeve tube causes the corresponding end of the projecting parts 112, 113 of the means for clamping the first clamping means to be released from the corresponding hollowed parts 115 of the drive ring 111.

From then on, the sleeve tube 108 is no longer constrained between the external shaft portion and the internal shaft portion.

When the angular movement of the shaft portions, and therefore of the sleeve tube, is continued by the user, the projecting parts of the first coupling means are released from the corresponding hollowed parts of the drive ring 111.

Figure 8:
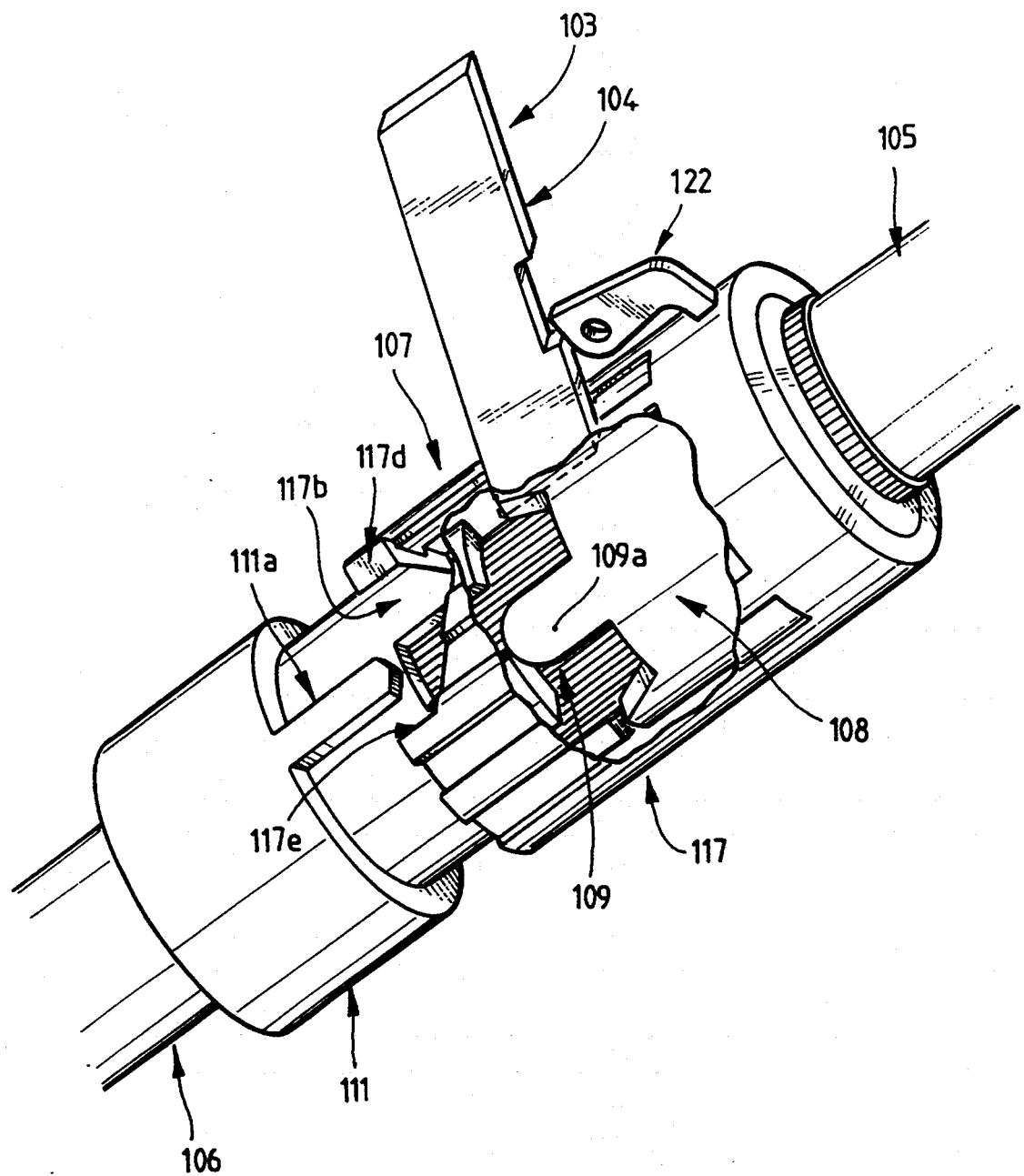

The sleeve tube is then in the retracted position FIG. 8), and the bolt interlocks to a greater depth in the groove, bearing on a deeper part of this groove and, by interacting with the shoulder of the bottom of this groove, it holds the sleeve tube in the retracted position.

In this retracted position of the sleeve tube, the first coupling means are therefore in a disengaged position, so that the internal shaft portion 105 carrying the steering wheel is no longer coupled to the drive ring 111, and can rotate freely with respect to the latter, and therefore to the external shaft portion connected to the rest of the steering mechanism.

The sleeve tube is held in this position by the bolt in the active anti-theft position.

An efficient anti-theft effect is then obtained, in as much as the steering wheel can rotate completely freely, whereas the angular movement of the rest of the steering mechanism is limited by the complementary thrust bearing surface 111a of the drive ring of the external shaft portion 106, whose angular movement is limited by the stop surfaces 117d, 117e of the displacement ring 117, this ring being blocked in rotation with respect to the column body 102 by the bolt 104 engaged in a groove in this ring.

Figure 9:
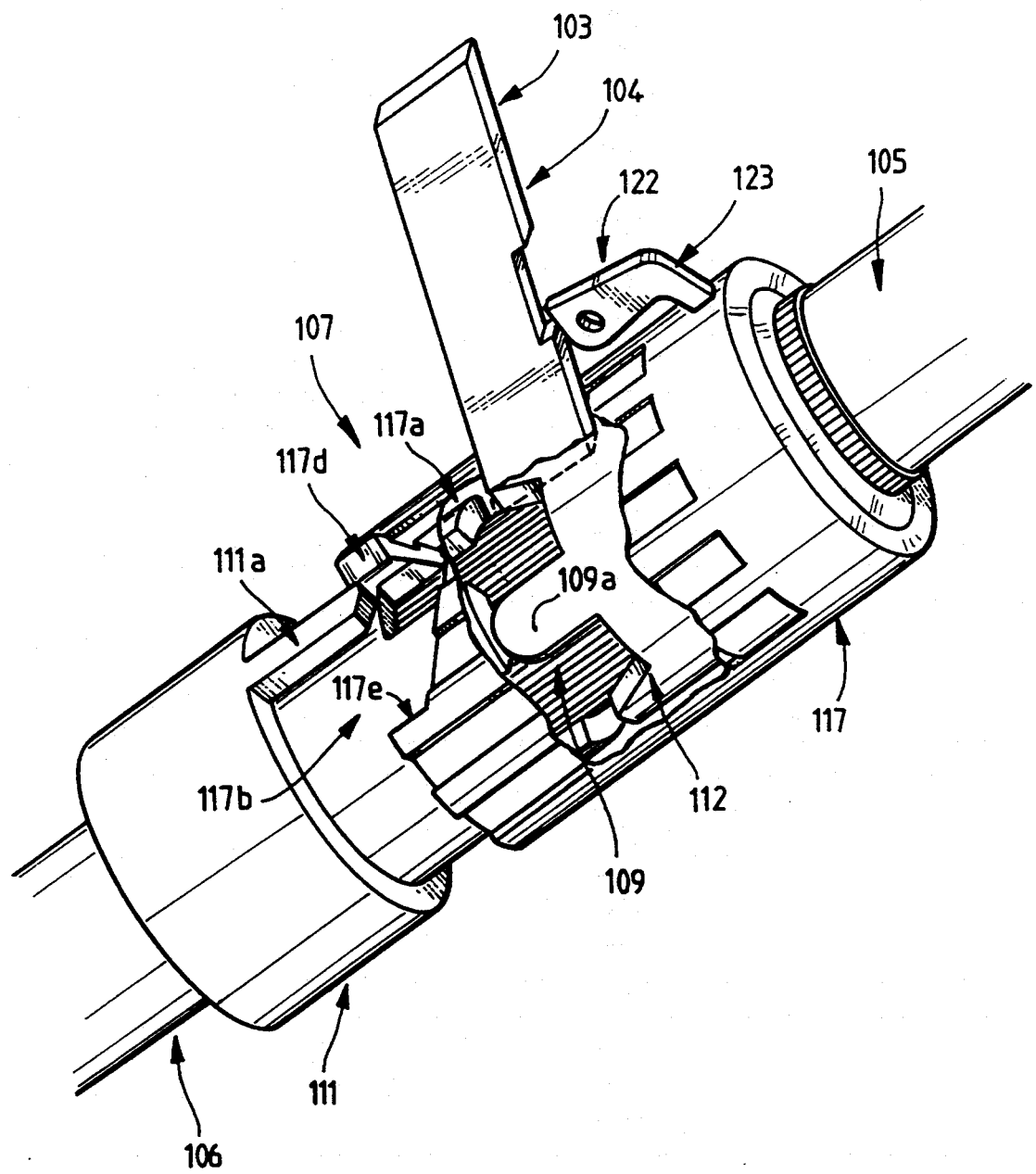

This position is represented in FIG. 9.

When the user desires to make further use of the vehicle, he causes, using for example a key, the anti-theft bolt mechanism of the vehicle to move from the active anti-theft position towards the retracted position.

The bolt is then freed from the groove in the displacement ring, and frees it.

The sleeve tube is then pushed towards its active position by the elastic stressing means 116.

However, as long as the, or each, projecting part of the first coupling means 109 is not aligned with the, or each, corresponding hollowed part of the drive ring 111, the sleeve tube cannot move completely towards its active position for coupling the two shaft portions.

In accordance with a conventional procedure, the user then moves the steering wheel and the internal shaft portion 105 angularly, until he obtains this single specific position in which the projecting parts come into alignment with the corresponding hollowed parts. The sleeve tube can then move towards its active position under the thrust of the elastic means 116 which relax.

Once the sleeve tube is in this position, the means 122 for locking the sleeve tube in the active position are lowered back into the position represented in FIG. 6, in which they block this sleeve tube in position.

The sleeve tube is, for its part, stressed by the elastic means 116 towards the active position, and the clamping means of the first coupling means clamp this sleeve tube in order to obtain the effect of constraining the latter between the internal and external shaft portions.

This clamping of the sleeve tube, and therefore its constraining between the two shaft portions is obtained extremely efficiently, because of the recovery of the energy released by the elastic means 116 as they relax.

The operation of this assembly can therefore be divided into several phases:

1) Normal operating phase

The linkage between the shaft portion carrying the steering wheel and the shaft portion connected to the rest of the steering mechanism is provided by the first means for coupling the sleeve tube with this shaft portion connected to the rest of the steering mechanism, and by the second means for coupling this sleeve tube with the shaft portion carrying the steering wheel. The sleeve tube is constrained between the two shaft portions by the clamping means of these first coupling means. The sleeve tube is held in position by the locking means.

2) Phase of disengaging the means for coupling the two shaft portions

When the user withdraws for example the key from anti-theft mechanism, its bolt moves from its retracted position towards its active position. The means for locking the sleeve tube in the active position become retracted. By turning the steering wheel, the user causes the bolt to come to bear in a groove in the displacement ring of the sleeve tube, in order to block this ring in rotation.

When the turning of the steering wheel, and therefore of the shaft portions, is continued, a cam-shaped portion of the displacement ring of this sleeve tube is pressed by a thrust bearing surface of the shaft portion connected to the rest of the steering mechanism, which causes this ring, and therefore this sleeve tube to move back from an active position towards a retracted position, in which the first coupling means are disengaged. With the first coupling means completely disengaged, the shaft portion carrying the steering wheel can rotate freely with respect to the rest of the steering column assembly. The sleeve tube is held in this position by a shoulder in the bottom of the groove bearing on the bolt.

It is thus no longer possible to force either of the components of this column assembly.

3) Phase of engaging the means for coupling the two shaft portions

When the user desires to make further use of the vehicle, he reinserts the key into the anti-theft bolt mechanism in order to move this bolt towards its retracted position. This movement of the bolt causes the displacement ring, and therefore the sleeve tube for linking the two shaft portions, to be freed. This sleeve tube is stressed towards its active position by the elastic means. By turning the steering wheel, the user causes the projecting and hollowed parts of the first means for coupling the sleeve tube with the shaft portion connected to the rest of the vehicle steering mechanism, to come into alignment, so that they can then be reengaged, and clamp the sleeve tube onto the shaft portion carrying the steering wheel, and provide linkage between these shaft portions, without play. In this position, the means for locking the sleeve tube in the active position are also moved by the anti-theft mechanism from their retracted position towards their active position for locking this sleeve tube in position. The assembly is then in the normal operating position.

It will be noted that these locking means can be connected to conventional means preventing the engine of the vehicle from being started, as long as they are not in the correct position of locking the sleeve tube in the active position.

This provides additional coupling safety.

Figure 10:
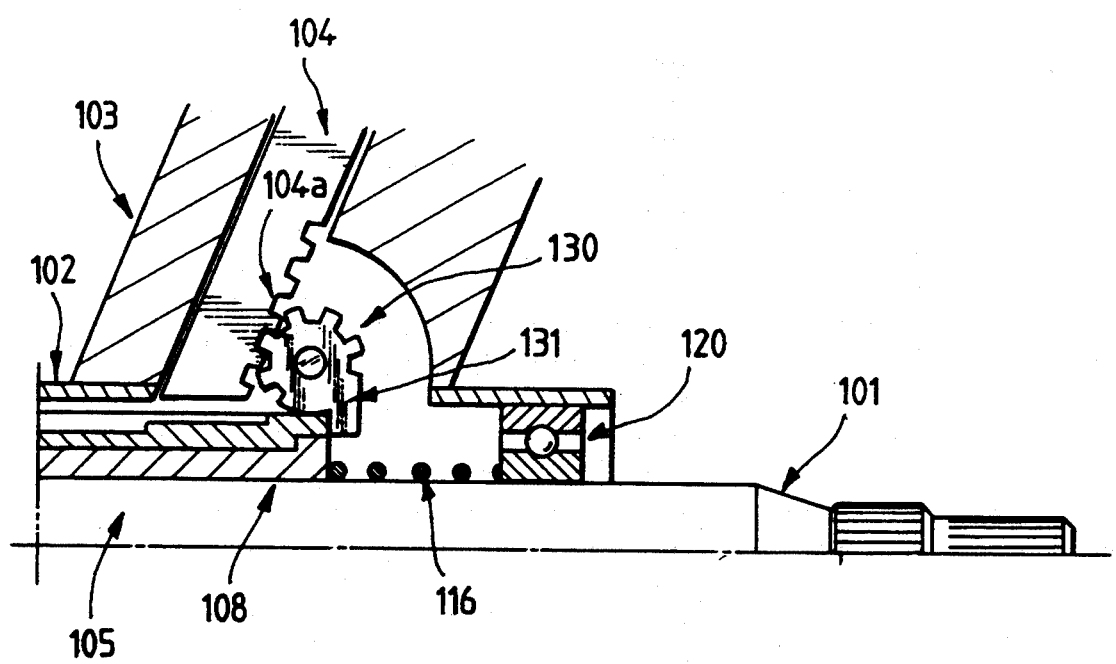
FIG. 10 represents an embodiment variant of means for locking the sleeve tube of the disengagable linkage means involved in the construction of an assembly according to the invention.

FIG. 10 shows one variant embodiment of the means for locking the sleeve tube in the active position.

Whereas in FIGS. 1 to 9, these locking means were formed by a member, in which one end was curved into a hook shape, in the embodiment represented in this FIG. 10, these locking means comprise a gear 130 including a projecting thrust bearing part 131 adapted to interact with a corresponding thrust bearing surface of the sleeve tube 108, or of the displacement ring 117, in order to hold this sleeve tube in position.

This corresponding thrust bearing surface of the sleeve tube is also formed by the end surface of the sleeve tube, or of its displacement ring, opposite that at which the first coupling means are provided.

This gear is adapted to interact with a toothed portion 104a of the bolt 104, in order to move it between an active position for locking the sleeve tube in the active position, and a retracted position in which the sleeve tube 108 can move towards its retracted anti-theft position for freeing the two shaft portions.

The other elements represented in this FIG. 10 are designated by the same reference numbers as those used to designate similar elements in FIGS. 1 to 9.

Figure 11:
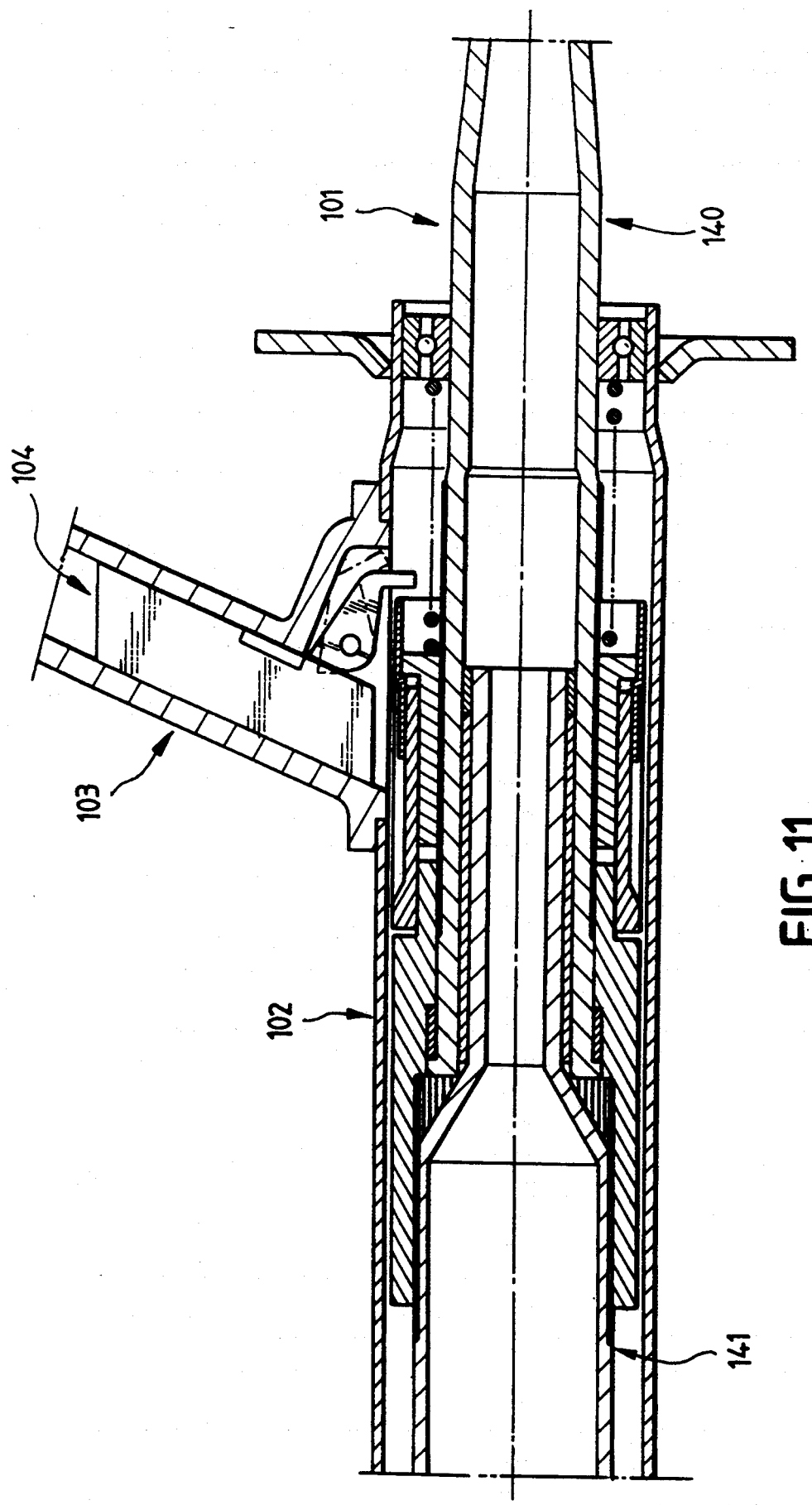
FIG. 11 represents an sectional view of a second embodiment of a steering column assembly according to the invention.

FIG. 11 shows yet another embodiment of an assembly according to the invention.

The steering shaft 101, the column body 102 and the anti-theft bolt mechanism 103 will be recognized in this FIG. 11.

The steering shaft still includes two shaft portions designated in these figures by the references 140 and 141.

However, whereas in the embodiments described with reference to FIGS. 1 to 9, the steering wheel was carried by the internal shaft portion, and the rest of the steering mechanism was connected to the external shaft portion, in this embodiment represented in FIG. 11, the steering wheel is carried by the external shaft portion 140, and the rest of the steering mechanism is connected to the internal shaft portion 141.

The other elements represented in this figure are similar to those represented in the preceding figures.

It is therefore clear that the column assembly according to the invention has optimum operational safety.

In fact, the disengagable linkage means are mounted so as to move between the two shaft portions, are stressed into the active position by elastic means, and are held in this position by locking means, whose position is controlled by the anti-theft bolt mechanism. Furthermore, in the active position, disengagable linkage means are constrained between the two shaft portions.

In the normal operating position, the rotational movement between the two shaft portions is therefore transmitted without play, and in an extremely reliable manner, that is to say without the risk of premature disengagement.

The transition into the anti-theft position occurs in accordance with a procedure which is conventional for the user, by withdrawal of the key from the anti-theft mechanism and movement of the steering wheel until the anti-theft effect is obtained.

The return to the normal driving position also occurs in accordance with a procedure which is conventional for the user, by insertion of the key into the anti-theft mechanism, and movement of the steering wheel until the effect of engaging the two shaft portions obtained, this occurring without the risk of attaining an erroneous coupling position for the two shaft portions.

We claim:

1. Steering column assembly for a motor vehicle, including a steering shaft (101) mounted so as to move in rotation in a column body (102) including an anti-theft bolt mechanism (103) for the vehicle, which can move between a retracted position and an active anti-theft position, the shaft including two shaft portions (105, 106; 140, 141), one carrying a steering wheel and the other being connected to the rest of a vehicle steering mechanism, said shaft portions being connected by disengagable linkage means (108) which can move, under the control of the anti-theft mechanism and by rotating the steering wheel and the shaft portions, between an active position for coupling the two shaft portions and a retracted anti-theft position freeing the two shaft portions from each other so that the shaft portion (105; 140) carrying the steering wheel can rotate freely with respect to the other shaft portion (106; 141) connected to the rest of the vehicle steering mechanism, the assembly being characterized in that corresponding end zones (105a, 106a) of the shaft portions are arranged one around the other, and in that the disengagable linkage means (108) comprises means connected to the shaft portion connected to the rest of the vehicle steering mechanism and means connected to and mounted so as to move around the shaft portion carrying the steering wheel between the active and the retracted position.

2. Assembly according to claim 1, characterized in that one of said shaft portions is an internal shaft portion (105) and carries the steering wheel.

3. Assembly according to claim 1, characterized in that one of said shaft portions is an external shaft portion (140) and carries the steering wheel.

4. Assembly according claim 1, characterized in that the linkage means comprise a sleeve tube (108) which can move around at least one of the shaft portions and includes first coupling means (109) adapted to interact with complementary coupling means of the shaft portion (106) connected to the rest of the vehicle steering mechanism, and secondary coupling means (110) adapted to interact with complementary coupling means of the shaft portion (105; 140) carrying the steering wheel.

5. Assembly according to claim 4, characterized in that at least the first coupling means (109) are disengagable from the complementary coupling means.

6. Assembly according to claim 5, characterized in that the sleeve tube (108) is mounted so as to move by sliding with respect to the two shaft portions, between a position of engaging and a position of disengaging the first coupling means (109), the second coupling means (110) being formed by radial projecting and hollowed parts complementary with this sleeve tube and with the corresponding shaft portion, allowing axial sliding of the sleeve tube with respect to this shaft portion, whereas the first coupling means (109) are formed by corresponding axial projecting and hollowed parts of the other shaft portion and of the sleeve tube.

7. Assembly according claim 6, characterized in that the first coupling means comprise at least two projecting parts (109a) adapted to interlock in two corresponding hollowed parts (109b) in the shaft portion connected to the rest of the steering mechanism.

8. Assembly according to claim 6, characterized in that the hollowed parts (109b, 115) of the first coupling means are provided in a drive ring (111) secured to the shaft portion connected to the rest of the steering mechanism.

9. Assembly according to claim 6, characterized in that the corresponding projecting and hollowed parts have contact surfaces, wherein some of the contact surfaces, of the corresponding projecting and hollowed parts of the clamping means are bulged, and the others of the contact surfaces are in shape of inclined planes.

10. Assembly according to claim 4, characterized in that the assembly includes means for constraining the sleeve tube (108) between the two shaft portions in its active position, in order to ensure transmission without rotational play between the shaft portions.

11. Assembly according to claim 10, characterized in that the sleeve tube can be deformed radially, and in that the first coupling means (109) furthermore comprise means for clamping the sleeve tube onto the shaft portion connected to the steering wheel, in its active position.

12. Assembly according to claim 11, characterized in that the clamping means comprise at least two axial projecting parts (112, 113) extending on either side of an axial slit (114) in the sleeve tube (108), and adapted to interlock in a corresponding axial hollowed part (115) in the shaft portion connected to the rest of the vehicle steering mechanism.

13. Assembly according to claim 12, characterized in that the axial projecting parts (112, 113) of the sleeve tube include slope surfaces (112a, 113a) for clamping the sleeve tube onto the shaft portion carrying the steering wheel.

14. Assembly according to claim 12, characterized in that the clamping means comprise two sets of projecting parts each separated by an axial slot in the sleeve tube, which are adapted to interlock in two corresponding axial hollowed pars in the external shaft portion.

15. Assembly according to claim 12, characterized in that the corresponding axial hollowed part comprises walls including slope surfaces for clamping the sleeve tube onto the shaft portion carrying the steering wheel.

16. Assembly according claim 4, characterized in that the first coupling means (109) are provided at one of the ends of the sleeve tube (108).

17. Assembly according to claim 4, characterized in that the assembly includes elastic means (116) for stressing the sleeve tube (108) into the active position for coupling two shaft portions.

18. Assembly according to claim 17, characterized in that the elastic means comprise a helical spring (116) located around the shaft portion carrying the steering wheel (105; 140), one end of which bears on one of the ends of the sleeve tube, and the other on a thrust bearing surface of the shaft portion carrying the steering wheel.

19. Assembly according to claims 18, characterized in that the helical spring bears on the end of the sleeve tube opposite to that at which the first coupling means are provided.

20. Assembly according to claim 4, characterized in that guide bearings (120, 121) for the shaft portion carrying the steering wheel are interposed between the column body and a corresponding part of the shaft portion carrying the steering wheel, and between another part of the shaft portion carrying the steering wheel and a corresponding part of the shaft portion connected to the rest of the steering mechanism.

21. Assembly according to claim 4, characterized in that the sleeve tube (108) includes two half-shells (108a, 108b).

22. A steering column assembly for a motor vehicle including a steering shaft (101) mounted so as to move in rotation in a column body (102) including an anti-theft bolt (104) mechanism (103) for the vehicle, which can move between a retracted position and an active anti-theft position, the shaft including two shaft portions (105, 106; 140, 141) one carrying a steering wheel and the other being connected to the rest of a vehicle steering mechanism, said shaft portions being connected by disengagable linkage means which can move, under the control of the anti-theft mechanism, between an active position for coupling the two shaft portions and a retracted anti-theft position freeing the two shaft portions from each other so that the shaft portion (105; 140) carrying the steering wheel can rotate freely with respect to the other shaft portion (106; 141) connected to the rest of the vehicle steering mechanism, the assembly being characterized in that corresponding end zones (105a, 106a) of the shaft portions are arranged one around the other, and in that the disengagable linkage means (108) are mounted so as to move around the shaft portion carrying the steering wheel, the disengagable linkage means comprising a sleeve tube (108) which can move around at least one of the shaft portions and which includes first coupling means (109) adapted to interact with complementary coupling means of the shaft portion (106) connected to the rest of the vehicle steering mechanism, and secondary coupling means (110) adapted to interact with complementary coupling means of the shaft portion (105; 140) carrying the steering wheel, the assembly including a ring (117) for displacing the sleeve tube (108), which ring is mounted movably in rotation around the sleeve tube (108) and includes:

at its outer surface, at least one axial groove (117a) adapted to receive the bolt (104) in its active position, in order to block the displacement ring in rotation with respect to the column body;

at one end of the ring, at least one portion in the shape of a displacement cam (117b) adapted to interact with a complementary thrust bearing surface (111a) of the shaft portion connected to the rest of the vehicle steering mechanism, and to move the sleeve tube towards its retracted position; and at the other end of the ring, at least one surface (117c) for displacing the sleeve tube from its active engagement position towards its retracted position for disengaging the first coupling means (109) when the shaft portions are rotated, by the bearing of the complementary thrust bearing surface on the portion in the shape of a displacement cam.

23. Assembly according to claim 22, characterized in that a plurality of axial grooves are regularly distributed over the outer surface of the displacement ring (117).

24. Assembly according to claim 22, characterized in that said at least one portion of the displacement ring (117) in the shape of a displacement cam, has a general V-shape, in which the ends of the arms extend in axial planar stop portions (117d, 117e) of the complementary thrust bearing surface (111a) of the stop portion connected to the rest of the vehicle steering mechanism, in order to limit the angular displacement thereof.

25. Assembly according to claim 24, characterized in that a functional clearance is provided between the thrust bearing surface (111a) of the shaft portion connected to the rest of the vehicle steering mechanism and the axial planar stop portions (117d, 117e) in order to avoid this assembly being stressed when the shaft portion connected to the rest of the vehicle steering mechanism returns elastically into position under the reaction of the vehicle tires.

26. Assembly according to claim 22, characterized in that said at least one groove in the displacement ring (117) includes a stepped bottom fitted with a shoulder bearing against the bolt (104) in the active position in order to delimit a non-return position of the sleeve tube in the active position for engaging the first coupling means (109) as long as the bolt is in the active position.

27. Assembly according to claim 22, characterized in that the displacement ring (117) includes two diametrically opposite hollowed parts in the shape of a displacement cam.

28. A steering column assembly for a motor vehicle, including a steering shaft (101) mounted so as to move in rotation in a column body (102) including an anti-theft bolt (104) mechanism (103) for the vehicle, which can move between a retracted position and an active anti-theft position, the shaft including two shaft portions (105, 106; 140, 141), one carrying a steering wheel and the other being connected to the rest of a vehicle steering mechanism, said shaft portions being connected by disengagable linkage means which can move, under the control of the anti-theft mechanism, between an active position for coupling the two shaft portions and a retracted anti-theft position freeing the two shaft portions from each other so that the shaft portion (105; 140) carrying the steering wheel can rotate freely with respect to the other shaft portion (106; 141) connected to the rest of the vehicle steering mechanism, the assembly being characterized in that corresponding end zones (105a, 106a) of the shaft portions are arranged one around the other, and in that the disengagable linkage means (108) are mounted so as to move around the shaft portion carrying the steering wheel, the disengagable linkage means comprising a sleeve tube (108) which can move around at least one of the shaft portions and which includes first coupling means (109) adapted to interact with complementary coupling means of the shaft portion (106) connected to the rest of the vehicle steering mechanism, and secondary coupling means (110) adapted to interact with complementary coupling means of the shaft portion (105; 140) carrying the steering wheel, the assembly including retractable means (122; 130) for locking the sleeve tube (108) in the active position.

29. Assembly according to claim 28, characterized in that the means for locking the sleeve tube in the active position are mounted so as to move between an active locking position and a retracted position for unlocking this sleeve tube by means of the anti-theft bolt mechanism of the vehicle (103).

30. Assembly according to claim 29, characterized in that the locking means comprise a locking member (122), in which one end is curved back into the shape of a hook (123) adapted to interact with a corresponding thrust bearing surface of the sleeve tube (108) in order to hold the latter in position, and in which the other end is connected to the anti-theft bolt mechanism.

31. Assembly according to claim 30, characterized in that the corresponding thrust bearing surface of the sleeve tube (108) is formed by the end surface of the latter opposite that at which the first coupling means (109) are provided.

32. Assembly according to claim 29, characterized in that the locking means comprise a gear (130) including a projecting thrust bearing part (131) adapted to interact with a corresponding thrust bearing surface of the sleeve tube (108) in order to hold the latter in position, and adapted to interact with a toothed portion (104a) of the bolt.

33. Assembly according to claim 32, characterized in that the corresponding thrust bearing surface of the sleeve tube (108) is formed by the end surface of the latter opposite that at which the first coupling means (109) are provided.

34. Assembly according to claim 28, characterized in that the means (122; 130) for locking the sleeve tube are connected to means preventing the motor of the vehicle from starting so long as they are not in the position for locking the sleeve tube in the active position.

35. A steering column assembly for a motor vehicle, including a steering shaft (101) mounted so as to move in rotation in a column body (102) including an anti-theft bolt (104) mechanism (103) for the vehicle, which can move between a retracted position and an active anti-theft position, the shaft including two shaft portions (105, 106; 140, 141), one carrying a steering wheel and the other being connected to the rest of a vehicle steering mechanism, said shaft portions being connected by disengagable linkage means which can move, under the control of the anti-theft mechanism and by rotating the steering wheel and the shaft portions, between an active position for coupling the two shaft portions and a retracted anti-theft position freeing the two shaft portions from each other so that the shaft portion (105; 140) carrying the steering wheel can rotate freely with respect to the other shaft portion (106; 141) connected to the rest of the vehicle steering mechanism, the assembly being characterized in that corresponding end zones (105a, 106a) of the shaft portions are arranged one around the other, and in that the disengagable linkage means comprise means connected to the shaft portion connected to the rest of the vehicle steering mechanism and means connected to and mounted so as to move around the shall portion carrying the steering wheel between the active and the retracted position, said means of the disengagable linkage means connected to said shaft portion carrying the steering wheel comprising: a coupling sleeve tube (108) movable between an active position and a retracted position by a displacement ring (117) movable around the sleeve tube; and comprising means (117a) adapted to engage the bolt (104) in its active position, and said means of the disengagable linkage means connected to the shaft portion connected to the rest of the vehicle steering mechanism moving the sleeve tube (108) towards its retracted position as the steering wheel rotates.

* * * * *